(12) United States Patent
Bonnell et al.

(10) Patent No.: US 6,720,553 B2
(45) Date of Patent: Apr. 13, 2004

(54) TIP CALIBRATION STANDARD AND METHOD FOR TIP CALIBRATION

(75) Inventors: Dawn Bonnell, West Chester, PA (US); Alan T. Johnson, Philadelphia, PA (US); Sergei V. Kalinin, Knoxville, TN (US); Marcus Freitag, Mohegan Lake, NY (US)

(73) Assignee: Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 10/346,630

(22) Filed: Jan. 17, 2003

(65) Prior Publication Data

US 2003/0132376 A1 Jul. 17, 2003

Related U.S. Application Data (60) Provisional application No. 60/350,225, filed on Jan. 17, 2002.

(51) Int. Cl.$^7$ ................................................ H01J 37/20
(52) U.S. Cl. ..................... 250/252.1; 250/306; 250/307
(58) Field of Search .............................. 250/252.1, 306, 250/307

(56) References Cited

U.S. PATENT DOCUMENTS 6,437,329 B1 * 8/2002 Yedur et al. ................ 250/306
6,455,847 B1 * 9/2002 Yedur et al. ................ 250/306

OTHER PUBLICATIONS

Z.Y. Li, B.Y. Gu and G.Z. Tang, "Phys Rev. B" 57, 9225 (1998).
S. Lanyi, J. Torok, and P. Rehurek, "J. Vac. Sci. Technol. B" 14, 892 (1996).
A. Efimov and S.R. Cohen "J. Vac. Sci. Technol. A" 18, 1051 (2000).
S. Belaidi, P. Girard and G. Levecque, "J. Appl. Phys." 81, 1023 (1997).
L. Olsson, N. Lin, V. Takimov and R. Erlandsson "J. Appl. Phys." 84, 4060 (1998).
H.O. Jacobs, H.F. Knapp, and A. Stemmer, "Rev. Sci. Instr." 70, 1756 (1999).
F. Robin, H. Jacobs, O. Homan, A. Stemmer, and W. Bachtold, "Appl. Phys. Lett." 76, 2907 (2002).
H. Sugimura, Y. Ishida, K. Hayashi, O. Taksi, and N. Nakagiri, "Appl. Phys. Lett." 80, 1459 (2002).
H.J. Dai, J.H. Hafner, A.G. Rinzler, D.T. Colbert, R.E. Smalley, "Nature" 384, 147 (1996).
S. Takahashi, T. Kishida, S. Akita, and Y. Nakayama, "Japn. J. Appl. Phys." B 40 4314 (2001).
S.B. Arnason, A.G. Rinzler, Q. Hudspeth, and A.F. Hebard, "Appl. Phys. Lett." 75, 2842 (1999).
N. Choi, T. Uchihashi, H. Nishijima, T. Ishida, W. Mizutani, S. Akita, Y. Nakayama, M. Ishikawa and H. Tokumoto "Jpn. J. Appl. Phys." B 39, 3707 (2000).
A. Bachtold, M.S. Fuhrer, S. Plyasunov, M. Forero, E.H. Anderson, A. Zettl, and P.L. McEuen, "Phys. Rev. Lett." 84, 6082 (2000).
S.V. Kalinin and D.A. Bonnell, "Appl. Phys. Lett." 78, 1306 (2001).

* cited by examiner

*Primary Examiner*—Kiet T. Nguyen
(74) *Attorney, Agent, or Firm*—Synnestvedt & Lechner LLP (57) ABSTRACT

The present invention is directed to a tip calibration standard for characterizing the geometric and electrostatic properties of the probe tips of scanning probe microscopes comprising a carbon nanotube mounted on a dielectric surface of a grounded, conductive substrate and connected to a contact mounted on the substrate. The present invention is also directed to methods for using such a tip calibration standard in calibrating probe tips, computing tip geometry and electrostatic data, and determining the convolution function so that tip-surface interaction effects can be separated from scanning probe microscope surface image data.

20 Claims, 5 Drawing Sheets

TIP CALIBRATION STANDARD AND METHOD FOR TIP CALIBRATION

CROSS REFERENCE TO RELATED APPLICATION

This claims the benefit of and incorporates by reference provisional Application No. 60/350,225, filed Jan. 17, 2002.

BACKGROUND OF THE INVENTION

Scanning Probe Microscopy (SPM) is a field of microscopy that encompasses a variety of techniques that probe the surface characteristics of matter on the micrometer to nanometer scales. These techniques are used in creating topography models of samples as well as maps of various physical or chemical properties detectable at the surface of a sample including composition, adhesion, friction, viscoelasticity and elastic modulus, electrostatic forces, magnetic forces, piezoelectric response, and surface potential distribution properties. These techniques are used to study nanometer-scale processes at surfaces, transport in electronic materials, self assembled nanostructures, block copolymers, ferroelectric and magnetic domain interactions, crack tip plasticity, variations in surface adhesion or hardness, and a variety of nanotube properties. Other applications include identification of contaminants, mapping of components in composite materials, detection of trapped charges, testing of electrical continuity, and failure analysis.

Common to SPM techniques is the use of a probe mounted to the free end of a cantilever arm in communication with a detector that measures deflection of the cantilever arm caused by interaction between the probe tip and the sample. The deflection data is processed in accordance with algorithms that produce models of surface topology and other features and properties of matter. In some SPM techniques, the probe tip comes in contact with the sample, either continuously or intermittently. In one form of contact SPM, the topography is measured by rastering the probe tip while in continuous contact with the sample surface to produce a high-resolution topographic map. In another form of contact SPM, the probe tip is in intermittent contact with the sample surface thereby reducing surface shear forces that can damage soft samples and decrease image resolution. Intermittent contact SPM also allows imaging of samples that are difficult to image by other contact SPM techniques.

In non-contact SPM techniques, the probe tip is maintained at a distance from the surface of the sample. Examples of SPM techniques that utilize non-contact scanning include Electric Force Microscopy (EFM), Scanning Impedance Microscopy (SIM), and Scanning Surface Potential Microscopy (SSPM).

SSPM is based on nulling the first harmonic of tip-surface force induced by tip AC bias. Nulling is achieved when the tip DC bias offset is equal to the surface potential, thus providing the local potential map. SSPM is characterized by the use of two different types of scans of the sample. In the first scan, a grounded probe tip collects surface topography data through intermittent contact with the sample. The second scan retraces the path of the first scan but maintains the probe tip at a distance from the surface of the sample. During the second scan, the probe tip is driven by an AC bias applied directly to the probe tip. The bias results in the periodic application of force at the bias frequency, which amplitude and phase depends on, in large part, driving frequency, tip surface capacitance and driving amplitude. In this manner, SSPM allows for the determination of local surface potential, visualization of electroactive grain boundaries, spatially resolved resistance and capacitance measurements of individual interfaces, and transport properties of samples.

A similar double scan approach is used in EFM and SIM. EFM involves the detection of the amplitude, phase or frequency shift of a DC-biased, mechanically oscillated probe tip which measures electrostatic charges and surface potential distribution properties of the sample surface.

SIM is based on the detection of phase and amplitude changes of a DC-biased, oscillated probe tip in which the cantilever oscillations are induced by a lateral AC bias applied across the sample. This technique allows imaging of resistive and capacitive barriers at the interfaces and can be used to determine local interface capacitance. The bias induces oscillations in surface potential resulting in the periodic force acting on the probe tip.

Electrostatic SPM techniques such as EFM, SIM and SSPM have become important tools for the characterization of the electric properties of material on the micron and submicron levels. S. V. Kalinin and D. A. Bonnell, *Scanning Probe Microscopy and Spectroscopy: Theory, Techniques and Applications*, ed. D. A. Bonnell (Wiley VCH, New York, 2000, p. 205). On grounded surfaces, these techniques provide information on the local potential as determined by, for example, surface composition, ferroelectric polarization and trapped charges. When applied to a laterally biased surface, these techniques can provide information on the local transport properties. These SPM techniques provide a powerful approach for the characterization of local transport properties and failure analysis of nano- and molecular electronic devices.

The effectiveness of these SPM techniques for quantitative nanometer scale imaging is influenced by geometric tip effects. These effects are combined with the surface data collected from the sample to produce a composite image of the surface data convoluted with artifacts of the probe tip used to obtain the image. The altered version of the surface is shown in the smearing of observed potential distributions and cross-talk between potential and topographic images. Z. Y. Li, B. Y. Gu, and G. Z. Yang, *Phys. Rev.* B 57, 9225 (1998); S. Lanyi, J. Torok, and P. Rehurek, *J. Vac. Sci. Technol.* B 14, 892 (1996); A. Efimov and S. R. Cohen, *J. Vac. Sci. Technol.* A 18, 1051 (2000). Thus, an accurate interpretation of the surface data requires the determination of, for example, the tip geometry and electrostatic properties that contribute to the SPM image such as tip-surface contrast transfer. By separating the tip contribution from the experimental data obtained regarding the surface properties of the sample, a more accurate representation of the sample surface can be produced. Accordingly, accurate imaging of potential distributions in active micro- and nanoelectronic devices by SSPM and related non-contact electrostatic SPM techniques requires an understanding of tip geometry and tip-surface contrast transfer.

For small tip-surface separations, the tip geometry can be accounted for through spherical tip approximation, and the corresponding geometric parameters can be obtained from electrostatic force- or force gradient distance and bias dependencies. S. Belaidi, P. Girard, and G. Leveque, *J. Appl. Phys.* 81, 1023 (1997); L. Olsson, N. Lin, V. Yakimov, and R. Erlandsson, *J. Appl. Phys.* 84, 4060 (1998). Such a calibration process is often tedious and tip parameters tend to change with time due to mechanical tip instabilities. H. O. Jacobs, H. F. Knapp, and A. Stemmer, *Rev. Sci. Instr.* 70, 1756 (1999). Alternatively, the tip contribution to measured surface properties can be quantified directly using an appropriate calibration method. F. Robin, H. Jacobs, O. Homan, A. Stemmer, and W. Bächtold, *Appl. Phys. Lett.* 76, 2907 (2000). If known, a tip-surface transfer function can be used to deconvolute the tip contribution from experimental data and obtain the exact surface potential distribution.

Systems with well defined metal-semiconductor interfaces have been considered as a "potential step" standard. H. O. Jacobs, P. Leuchtmann, O. J. Homan, and A. Stemmer, *J. Appl. Phys.* 84, 1168 (1998). However, the presence of surface states and mobile charges significantly affect potential distributions of grounded surfaces. In addition, such a standard is expected to be sensitive to environmental conditions such as humidity, temperature, and other factors. H. Sugimura, Y. Ishida, K. Hayashi, O. Takai, and N. Nakagiri, *Appl. Phys. Lett.* 80, 1459 (2002).

The applicability of these SPM techniques has been hindered by the lack of reliable standards for electrostatic SPM resolution. While the performance of topographic SPM can be reliably calibrated with calibration gratings, no such standard has been developed for electrostatic measurements. Such a standard is critical for the unambiguous determination of the tip contribution to surface properties, especially on the sub-micron scale. If known, a tip-surface transfer function can be used to deconvolute tip contribution from experimental data and obtain exact surface potential distribution.

The well-defined geometry and stability exhibited by carbon nanotubes have enabled their successful application as scanning probe microscopy probes. H. J. Dai, J. H. Hafner, A. G. Rinzler, D. T. Colbert, R. E. Smalley, *Nature* 384, 147 (1996); S. Takahashi, T. Kishida, S. Akita, and Y. Nakayama, *Jpn. J. Appl. Phys.* B 40, 4314 (2001); S. B. Arnason, A. G. Rinzler, Q. Hudspeth, and A. F. Hebard, *Appi. Phys. Lett.* 75, 2842 (1999); N. Choi, T. Uchihashi, H. Nishijima, T. Ishida, W. Mizutani, S. Akita, Y. Nakayama, M. Ishikawa, and H. Tokumoto, Jpn. *J. Appl. Phys.* B 39, 3707 (2000). It has not, however, been heretofore recognized that carbon nanotubes can be combined into a tip calibration standard useful as a calibration standard for probe tips in electrostatic SPM.

SUMMARY OF THE INVENTION

In accordance with one aspect of the present invention, there is provided a tip calibration standard for calibrating scanning probe microscope probe tips comprising a carbon nanotube structure adapted for characterizing the geometric and electrostatic properties of probe tips used in SPM. In particular embodiments, the standard comprises a metallic or semiconductive, single-wall or multi-wall carbon nanotube disposed on a dielectric surface of a grounded, conductive substrate and in connection with a contact mounted on the substrate.

In accordance with another aspect of the present invention, there is provided a method for calibrating an SPM probe tip mounted on a cantilever arm in communication with a cantilever deflection detector comprising the steps of applying an AC bias to the nanotube of the standard of the present invention, measuring with the detector the cantilever deflection caused by a scan of the AC-biased standard with the probe tip; and converting the cantilever deflection data into probe tip data. This method of SPM probe tip calibration permits simultaneous imaging of the tip geometry and measurement of electrostatic resolution, as well as determining the convolution function for electrostatic SPM. In embodiments in which the nanotube diameter is known, the proportionality coefficient between tip capacitance and the deflection data also can be computed.

DETAILED DESCRIPTION OF THE INVENTION

According to one aspect of the present invention, there is provided a tip calibration standard comprising a carbon nanotube disposed on the dielectric surface of a grounded, conductive substrate and connected to a contact mounted on the substrate. An exemplary configuration is shown FIG. 1(a) in which standard 10 comprises nanotube 12 disposed on dielectric surface 14 of substrate 16 having a ground 18. The nanotube 12 also is connected to contact 20. This standard is applicable to the calibration of probe tips for scanning probe microscopes using a wide variety of scanning techniques and can provide a simultaneous measure of probe tip topographic and electrostatic resolution as well as the convolution function for electrostatic scanning probe microscopy. As such, the standard has applicability to electrostatic imaging, tip calibration and general nanoscale imaging.

The nanotube component of the standard may be a single-walled nanotube (SWNT) or a multi-walled nanotube (MWNT) of any continuous length sufficient to avoid tip-contact interaction when the nanotube is scanned by a SPM probe tip. Preferably, the nanotube is at least about 1 micron in length, has a diameter not greater than about 10 nm, and is substantially straight. The nanotube may have a chirality associated with either metallic or semiconducting properties, and may be formed either in situ on the dielectric surface of the substrate, or apart from the substrate. In the case of typical SPM probe tips, the tip radius is in the range of about 10 nm to about 100 nm, and is significantly larger than the radius of the nanotube. While nanotubes of any size capable of enabling probe tip calibration are suitable for use in the standard of the present invention, the minimum preferred size ratio of probe tip radius to nanotube diameter is about 3:1 As a result of this size differential, the SIM amplitude signal provides a direct measure of a spatially-dependent tip-surface capacitance gradient. Effectively, the nanotube is used to probe tip shape. For an arbitrary surface, the experimental signal is the convolution of tip shape and surface potential distribution. Provided the tip shape is known, the surface potential distribution can be extracted from experimental data.

Nanotubes suitable for use in the present invention may be grown by the deposition of carbon onto a surface either directly by means of arc deposition or laser ablation, or through gas phase decomposition, also known as catalytic chemical vapor deposition (CVD). In CVD, the diameter and electrical properties of the nanotubes can be controlled by careful selection of substrate, catalyst, feed gas and temperature. The catalyst preferably comprises a transition metal or combination of metals such as nickel, cobalt, or a mixture of alumina, iron, and molybdenum particles. In a preferred embodiment, a mixture of alumina, iron, and molybdenum particles is used, and it is also preferred to combine the mixture with ethanol to create a colloidal suspension of alumina. J. H. Hafner, C. L. Cheung, and C. M. Lieber, *J. Am. Chem. Soc.* 121, 9750 (1999); M. Freitag, M. Radosavljevic, Y. Zhou, A. T. Johnson, and W. F. Smith, *Appl. Phys. Lett.* 79, 3326 (2001). The colloidal suspension is applied to the substrate which is then heated in an argon, hydrogen, ethylene mixture at about 820° C. This process yields predominantly SWNT with a small fraction of MWNT with a few shells. Through the selection of specific formation conditions, the specific diameter and electrical properties of the SWNT that are formed can be controlled to a sufficient degree that the use of SWNTs with established diameters and electrical properties permit quantitative measurements in the calibration of SPM probe tips. SWNTs can be distinguished based on the apparent height of 3 nm or less as measured by Atomic Force Microscopy (AFM).

Figure 1A:
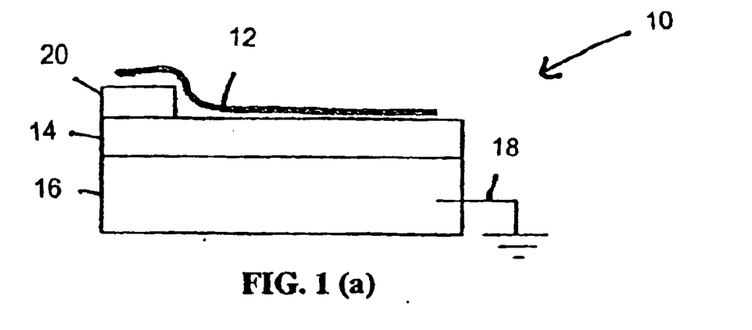
FIG. 1(a) is a schematic diagram of a carbon nanotube standard in accordance with the present invention.

The substrate component of the standard may be any conducting substrate, either metallic or semiconducting, that is grounded and has at least one dielectric surface. The substrate is grounded, as shown in FIG. 1(*a*), to avoid noise pick-up and capacitive cross-talk through the dielectric surface. In view of the scale at which the nanotube is being scanned, the dielectric surface on which the nanotube is disposed preferably has a roughness of no greater than about 3 nm RMS. It is also preferred that the dielectric surface of the substrate has a resistivity high enough to prevent leakage from the nanotube disposed thereon into the substrate. In preferred embodiments, the substrate is a semiconductor, and even more preferably, comprises silicon or gallium arsenide and the dielectric surface is an oxide layer. In a particularly preferred embodiment, the substrate comprises silicon and silicon oxide configured in layers in which a layer of silicon dioxide having a thickness of about 225 nm is disposed on a grounded layer of silicon. In such an embodiment, the silicon layer is preferably degenerately doped silicon, which acts as a back gate.

The contact component of the standard may comprise any conducting material that is capable of being mounted on the substrate in contact with the nanotube. Preferably, the contact is metallic, even more preferably gold to ensure chemical stability, and when mounted on the substrate, extends beyond the surface of the substrate by no more than about 50 nm. The contact may be formed by any suitable method including e-beam lithography, optical lithography, using shadow masks, and thermal or e-beam evaporation of chromium and gold. In this manner, the nanotube is a molecular-size element in a circuit.

In accordance with another aspect of the invention, there is provided a method for calibrating the probe tip of a scanning probe microscope mounted on a cantilever arm in communication with a cantilever deflection detector comprising the steps of applying an AC bias to the nanotube of the standard of the present invention, measuring with the detector the cantilever deflection caused by a scan of the AC-biased standard with the probe tip; and converting the cantilever deflection data into probe tip data. An embodiment of the method of the present invention is shown schematically in FIG. 2

In the application step, an AC voltage bias is applied to the nanotube, resulting in the oscillation of the SPM probe tip due to the capacitive force. A. Bachtold, M. S. Fuhrer, S. Plyasunov, M. Forero, E. H. Anderson, A. Zettl, and P. L. McEuen, *Phys. Rev. Lett.* 84, 6082 (2000); S. V. Kalinin and D. A. Bonnell, *Appl. Phys. Lett.* 78, 1306 (2001). In one embodiment, the AC bias is applied at a preferred voltage of about 50 mV to about 200 mV, at a frequency at or near the resonant frequency of the cantilever, and applied directly to the carbon nanotube circuit. In other embodiments such as, for example, low-temperature imaging or other special conditions, voltages both above and below the range of about 50 mV to about 200 mV may be used as well.

Figure 1B:
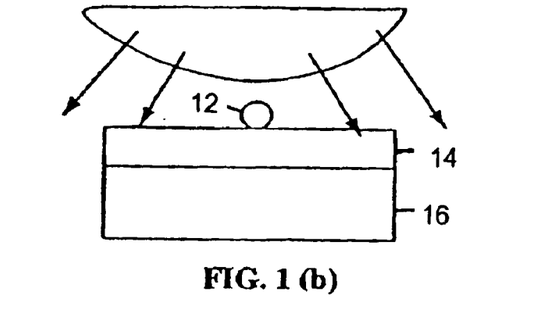
FIG. 1(b) is a schematic diagram showing tip-surface interaction in scanning probe microscopy.
Figure 1C:
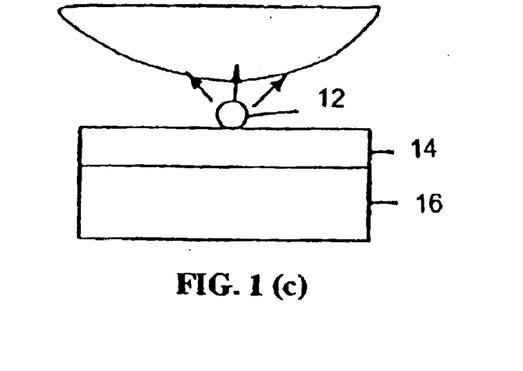
FIG. 1(c) is a schematic diagram showing tip-surface interaction in scanning impedance microscopy.

As shown in FIG. 1(*b*), during conventional use of a scanning probe microscope in scanning a nanotube in which an AC bias is applied to the probe tip, the tip interacts with both the nanotube and the substrate, the substrate providing the dominant contribution to the force signal. Moreover, surface and oxide trapped charges redistribute under the bias, resulting in smearing of the electrostatic nanotube profile. As shown in FIG. 1(*c*), however, application of the AC bias to the nanotube and the preferable use of a DC-biased tip resolve both problems. As only the nanotube is biased, the substrate does not contribute to tip-surface interaction. Moreover, the characteristic relaxation times for surface charges in air are relatively high and are on the order of seconds. As a result, surface charge dynamics do not contribute to measurements at high frequencies, such as about 10 to about 100 kHz. Further, the potential and field in the nanotube-surface system can be calculated by straightforward mathematical techniques due to the ideal geometry of the system, where similar calculations for the tip require a knowledge of the instantaneous tip geometry. As the typical lateral size of the nanotube is significantly smaller than the probe tip radius of curvature, the nanotube effectively probes the tip geometry.

In the measuring step, the measured quantity is the amplitude of cantilever oscillation induced by the scan of the AC-biased standard. The cantilever arm of the SPM may be uncoated or provided with conductive or magnetic coatings. When uncoated, the cantilever is only slightly conductive because of n-type doping with phosphorous. For a coated cantilever, the choice of the coating can depends on a variety of factors including the type of process, the conductivity of sample, the working medium, and the presence of adsorbate on surface. Examples of suitable cantilever coatings include $W_2C$, TiN, TiO, Ti—Pt, conductive diamond, and Cr—Au. The thickness of the coatings is preferably chosen to optimize lateral resolution of images and stable performance of the cantilever under different conditions of measurement. Conductive cantilever coatings are particularly useful in SPM techniques such as EFM and SSPM.

The converting step involves the translation of cantilever deflection data into tip data. The tip data derived by the conversion can be used to characterize both the geometric and electrostatic properties of the probe tip and to deconvolute the SPM image so that tip-surface effects can be separated from the experimental data.

The tip calibration standard and method of the present invention are applicable to a wide variety of SPM techniques as each of these techniques generate, in their own way, convoluted images of the measured surface and tip-surface effects. Moreover, the standard is capable of serving as a tip calibration standard when used in accordance with a wide variety of SPM techniques.

While all SPM techniques are considered within the scope of the methods for using the tip calibration standard described herein, a particular example employing SSPM is described below.

EXAMPLE 1

Figure 2:
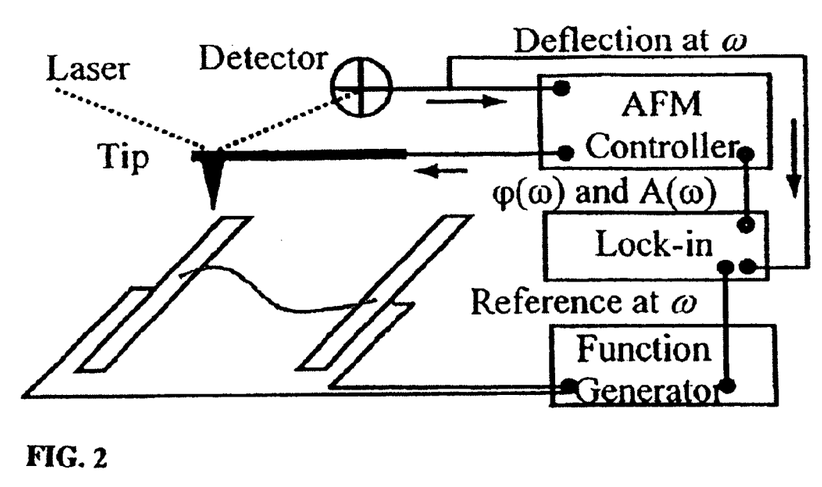
FIG. 2 is a schematic diagram of the standard positioned in a scanning probe microscope in accordance with the method of the present invention.

In accordance with the dual-scan SSPM technique, the probe tip first acquires the surface topography of the standard by intermittent contact with the surface and then retraces the surface profile maintaining a constant tip-surface separation. Measurements are performed using CoCr coated tips (Metal coated etched silicon probe, Digital Instruments, $l \approx 225$ m, resonant frequency of about 62 kHz) and Pt coated tips (NCSC-12 F, Micromasch, $l \approx 250$ m, resonant frequency of about 41 kHz), further referred to as tip 1 and tip 2. As shown in FIG. 2, a lock-in amplifier is used to determine the magnitude and phase of the cantilever response. The output amplitude, R, and phase shift, $\theta$, are recorded by the AFM electronics (Nanoscope-IIIA, Digital Instruments). To avoid cross-talk between the sample modulation signal and topographic imaging, the frequency of AC voltage applied to the nanotube is selected to be far from the cantilever resonant frequency of 50 kHz.

The force between the tip and the surface can be written as a function of capacitances as $$2F_z = C'_{ts}(V_t-V_s)^2 + C'_{ns}(V_n-V_s)^2 + C'_{tn}(V_t-V_n)^2 \quad (1)$$

where $V_t$ is tip potential, $V_n$ is nanotube potential and $V_s$ is surface potential, $C_{ts}$ is tip-surface capacitance, $C_{ns}$ is nanotube-surface capacitance and $C_{tn}$ is tip-nanotube capacitance. C' refers to derivative of capacitance with respect to the z direction perpendicular to the surface. When an AC bias is applied to the nanotube, $V_n = V_0 + V_{ac} \cos(\omega t)$ and $V_s = V_0$. Therefore, the first harmonic of tip-surface force is:

$$F_{1\omega} = C'_{tn} V_{ac}(V_t - V_0) \quad (2)$$

In comparison, application of an ac bias to the tip, $V_t = V_{dc} + V_{ac} \cos(\omega t)$ yields $$F_{1\omega} = C'_{tn} V_{ac}(V_{dc} - V_0) + C'_{ts} V_{ac}(V_{dc} - V_s) \quad (3)$$

Therefore, applying an AC bias directly to the carbon nanotube allows the tip-surface capacitance to be excluded from the overall force.

Figure 3:
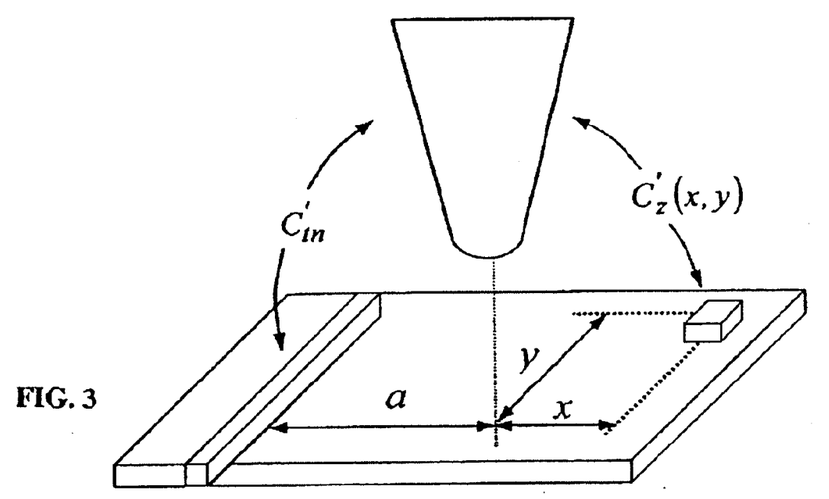
FIG. 3 is a schematic diagram showing a probe tip, the nanotube standard, and the tip-surface transfer function defined as a capacitance gradient.
Figure 4:
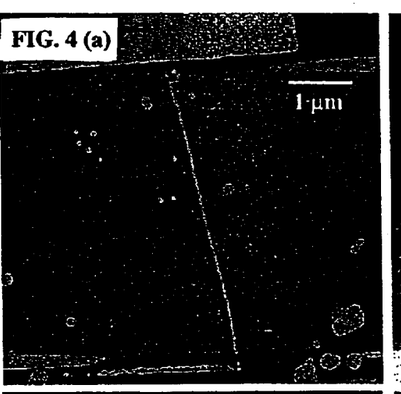
FIG. 4(a) is an image of the surface topography of a nanotube standard in accordance with the present invention.
FIGS. 4(b)–(d) are scanning impedance microscopy images of a nanotube standard in accordance with the present invention.

Equation (2) can be generalized in terms of the tip-surface transfer function $C'_z(x,y)$, defined as the capacitance gradient between the tip and a region dxdy on the surface as shown in FIG. 3 as $$F_{1\omega} = (V_t - V_0) \int C'_z(x,y) V_{ac}(x,y) dxdy \quad (4)$$

For the nanotube oriented in the y-direction and taking into account small width, $w_0$, of the nanotube compared to the tip radius of curvature, Equation (4) can be integrated as $$F_{1\omega}(a) = w_0 V_{ac}(V_t - V_0) \int C'_z(a,y) dy \quad (5)$$

where $a0$ is the distance between the projection of the tip and the nanotube. Assuming a rotationally invariant tip, differential tip-surface capacitance is $C_z(x,y) = C_z(r)$, where $r = \sqrt{x^2+y^2}$ and Equation (5) can be rewritten as a function of a single variable, $a$. Therefore, the partial tip-surface capacitance gradient $C'_z(r)$ can be found by numerically solving Equation (5) using experimentally available force profiles across the nanotube, $F_{1\omega}(a)$.

The validity of the proposed standardization technique is illustrated in FIGS. 4(a) through 4(d). If the measurements are made sufficiently far (1–2 $\mu$m) from the biasing contact, the image background and potential distribution along the nanotube are uniform indicating the absence of contact-probe interactions.

Figure 5A:
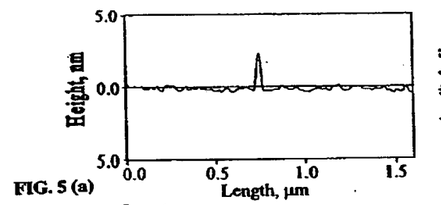
FIG. 5(a) is a topographic profile of a nanotube standard in accordance with the present invention.
Figure 5B:
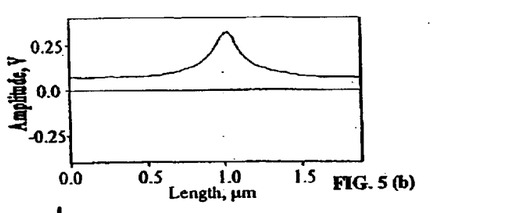
FIG. 5(b) is a scanning impedance microscopy amplitude profile of a nanotube standard in accordance with the present invention.

FIGS. 5(a) and (b) show topographic and amplitude profiles across the nanotube standard. The height of the nanotube is approximately 2.7 nm, while apparent width is about 40 nm due to the convolution with the tip shape. Simple geometric considerations yield a tip radius of curvature as $R \approx 75$ nm. Full width at half maximum (FWHM) of the amplitude profile can be as small as about 100 nm and increases with tip-surface separation. This profile is a direct measure of the tip-surface transfer function through Equation (5).

Figure 5C:
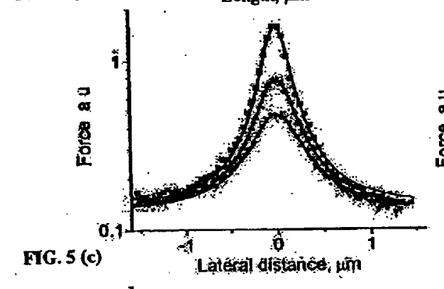
FIGS. 5(c) and (d) are force profiles at different lift heights scanning a nanotube standard in accordance with the present invention.
Figure 5D:
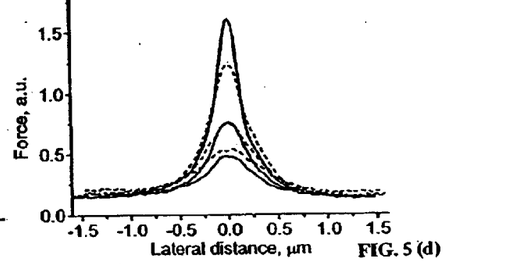
Figure 5E:
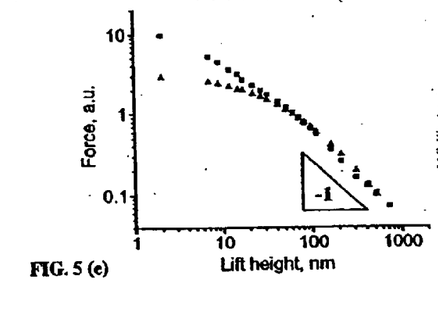
FIG. 5(e) is a plot of peak height as a function of tip-surface separations.
Figure 5F:
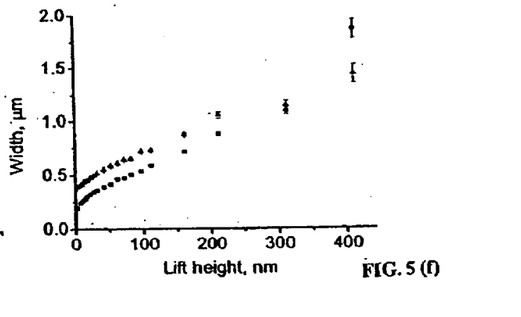
FIG. 5(f) is a plot of width as a function of tip-surface separations.

To analyze the distance dependence and properties of $F_{1\omega}$, amplitude profiles were averaged over about 32 lines and fitted by the Lorentzian function, $$y = y_0 + \frac{2A}{\pi} \frac{w}{4(x-x_c)^2 + w^2} \quad (6)$$

where $y_0$ is an offset, A is area below the peak, w is peak width and $x_c$ is position of the peak. Note that Equation (6) provides an extremely good description of the experimental data as shown in FIG. 5(c). The offset $y_0$ provides a direct measure of the non-local contribution to the SPM signal due to the cantilever and conical part of the tip. A. K. Henning, T. Hochwitz, J. Slinkman, J. Never, S. Hoffmann, P. Kaszuba, C. Daghlian, *J. Appl. Phys.* 77, 1888 (1995); Sergei V. Kalinin and Dawn A. Bonnell, *Phys. Rev. B* 63, 125411 (2001); G. Koley, M. G. Spencer, and H. R. Bhangale, *Appl. Phys. Lett.* 79, 545 (2001). The profile shape is tip dependent and profiles for tips 1 and 2 are compared in FIG. 5(d). The distance dependence of peak height $h = 2A/\pi w$ is shown in FIG. 5(e). For large tip-surface separations $h \sim 1/d$. The distance dependence of width, w, is shown in FIG. 5(f) and is almost linear in distance for d>100 nm. Similar behavior was found for profile width for "potential step" type standards such as ferroelectric domain walls and biased interfaces. In the particular case of the amplitude profile given by Equation (6), the local part of the differential tip-surface capacitance can be found solving Equation (5) as $$C'_z = \frac{2A}{\pi} \frac{w}{(4r^2 + w^2)^{3/2}} \quad (7)$$

where A and w are z-dependent parameters determined in Equation (6) and r is radial distance.

Figure 6:
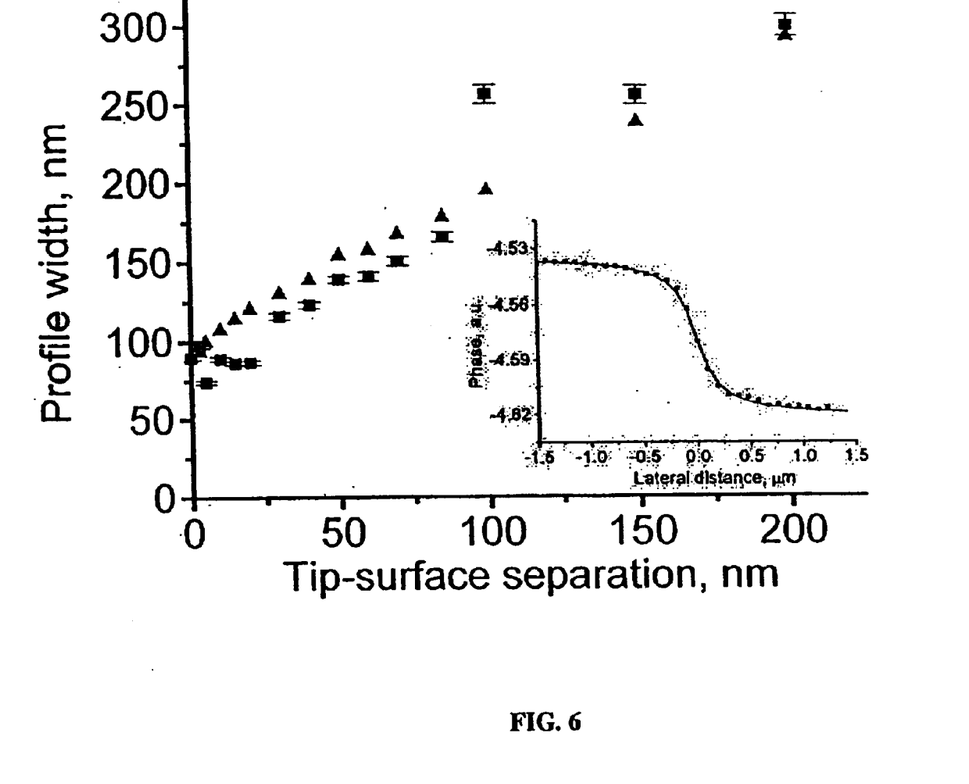
FIG. 6 is a plot of the profile width for a nanotube standard in accordance with the present invention and a scanning impedance microscopy image of the $SiTiO_3$ grain boundary as a function of lift height.

Equation (7) can be used to determine the tip shape contribution to electrostatic SPM measurements in systems with arbitrary surface potential distributions. For a stepwise surface potential distribution, $V_{surf} = V_1 + (V_2 - V_1)\theta(x)$, where (x) is a Heaviside step function, the measured potential profile is $V_{eff} = V^1 + V_2 \arctan(2x/w)/\pi$, provided that the cantilever contribution to the measured potential is small. A similar phenomenological expression is expected to describe phase and amplitude profiles in open-loop SSPM and SIM. FIG. 6 shows the phase profile across a grain boundary in a Nb-doped $SrTiO_3$ bicrystal. From independent measurements the double Schottky barrier width is <20 nm, i.e. well below the SPM resolution. Note the excellent agreement between the measured and simulated profile shape. The distance dependence of profile width for the nanotube standard and SIM phase image of grain boundary are compared in FIG. 6. The profile width determined from SSPM measurements is significantly larger indicating feedback and mobile surface charge contribution to the profile width. Sergei V. Kalinin and Dawn A. Bonnell, *Phys. Rev.* B 62, 10419 (2000).

FIG. 5(a) shows a topographic profile and FIG. 5(b) shows a SIM amplitude profile across a carbon nanotube. The width of electrostatic profile (about 90 nm) is significantly larger than that of the topographic profile (about 30 nm), providing a direct measure of tip resolution in topographic and electrostatic measurements. The size of the nanotube per se (about 3 nm) is much smaller than either width. FIG. 5(c) shows force profiles at lift height of 10 nm (square), 30 nm (up triangle) and 100 nm (down triangle) and corresponding Lorentzian fits. FIG. 5(d) shows force profiles at lift height of 10 nm, 30 nm and 100 nm for tip 1 (solid line) and tip 2 (dash line). Peak height shown in FIG. 5(e) and width shown in FIG. 5(f) is plotted as a function of tip-surface separation for tip 1 (square) and tip 2 (triangle).

FIG. 6 shows a profile width for a carbon nanotube standard (triangle) and SIM phase image of the SrTiO3 grain boundary (square) as a function of lift height. The inset shows comparison of measured (square) and simulated (line) phase profiles.

What is claimed is:

1. A tip calibration standard for calibrating scanning probe microscope probe tips comprising a carbon nanotube having a length of at least about 1 micron and a diameter of not greater than about 10 nm, disposed on a dielectric surface of a grounded, conductive substrate and in connection with a contact mounted on the substrate.

2. The standard of claim 1 wherein the nanotube is metallic.

3. The standard of claim 1 wherein the nanotube is semiconductive.

4. The standard of claim 1 wherein the nanotube is a single-walled nanotube.

5. The standard of claim 1 wherein the nanotube is a multi-walled nanotube.

6. The standard of claim 1 wherein the substrate is semiconductive.

7. The standard of claim 1 wherein the substrate comprises silicon.

8. The standard of claim 1 wherein the dielectric surface of the substrate has a roughness of no greater than about 3 nm RMS.

9. The standard of claim 1 wherein the contact is metallic and, when mounted on the substrate, extends beyond the surface of the substrate by no more than about 50 nm.

10. The standard of claim 1 wherein the dielectric surface of the substrate has a resistivity sufficient to prevent leakage from the nanotube disposed thereon into the substrate.

11. The standard of claim 1 wherein the nanotube is a single-walled nanotube, the substrate comprises grounded silicon having a surface layer of silicon oxide with a roughness of no greater than about 3 nm RMS.

12. A method for calibrating a scanning probe microscope probe tip mounted on a cantilever in communication with a cantilever deflection detector comprising the steps of:

applying an AC bias to the nanotube standard of claim 1;

measuring a detector cantilever deflection caused by a scan of the AC-biased standard with the probe tip; and converting the cantilever deflection data into probe tip data.

13. The method of claim 12 wherein the AC bias is applied directly to the nanotube.

14. The method of claim 12 further comprising the step of computing the probe tip geometry from the probe tip data.

15. The method of claim 12 further comprising the step of computing electrostatic imaging data from the probe tip data.

16. The method of claim 12 further comprising the step of computing the convolution function from the probe tip data.

17. The method of claim 12 further comprising the step of computing the proportionality coefficient between tip capacitance and the deflection data and wherein the diameter of the nanotube is known.

18. The method of claim 12 wherein the voltage of the AC bias on the nanotube is about 50 mV to about 200 mV.

19. The method of claim 12 further comprising the step of computing the probe tip geometry, the electrostatic data, and the convolution function from the probe tip data and wherein the AC bias is applied directly to the nanotube at a voltage of between about 50 mV and about 200 mV, and at a frequency at or near the resonant frequency of the cantilever.

20. The method of claim 19 further comprising the step of computing the proportionality coefficient between tip capacitance and the deflection data and wherein the diameter of the nanotube is known.

* * * * *